April 19, 1927. 1,625,357
H. A. GEHRES
CYLINDER AND LINER CONSTRUCTION
Filed Aug. 27, 1925
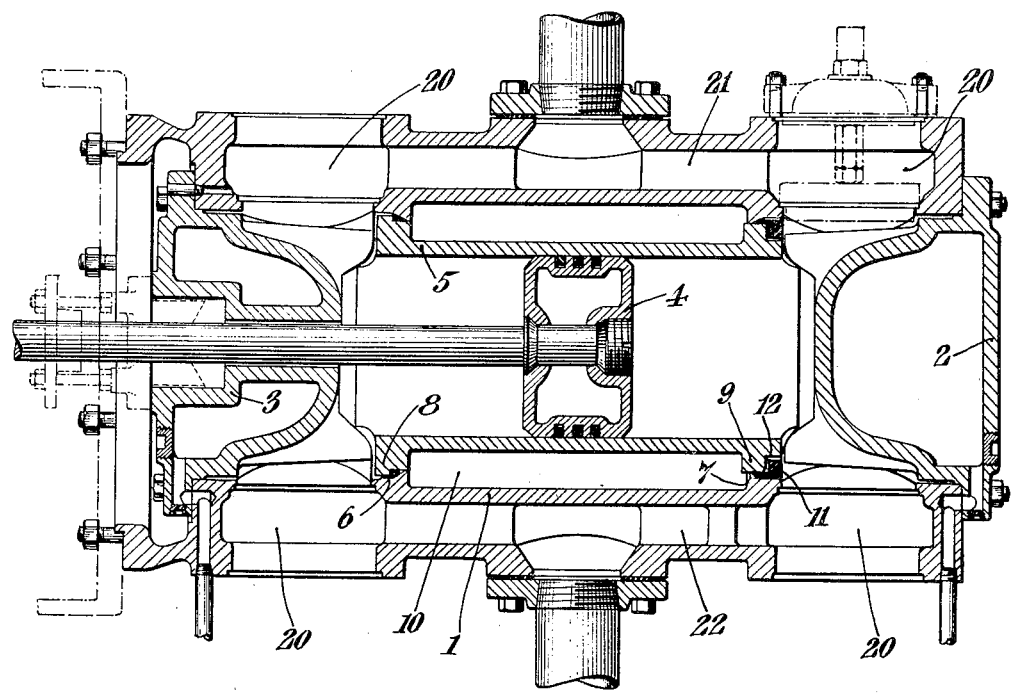
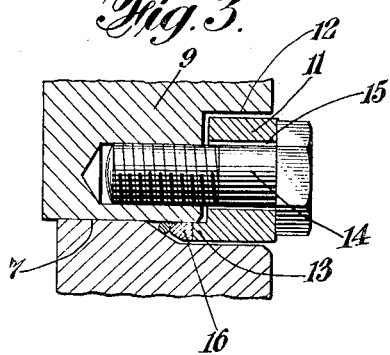
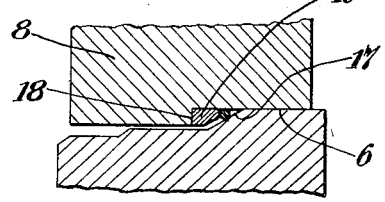
Inventor
Hewitt A. Gehres
By his Attorneys Patented Apr. 19, 1927.

1,625,357

UNITED STATES PATENT OFFICE.

HEWITT A. GEHRES, OF MOUNT VERNON, OHIO.

CYLINDER AND LINER CONSTRUCTION.

Application filed August 27, 1925. Serial No. 52,743.

The invention relates to cylinders for air compressors and similar purposes, and more particularly to a liner construction for such cylinders having certain features as hereinafter referred to, tending toward simplicity and economy of structure, interchangeability, efficiency from the standpoint of heat transfer, etc.

The specification hereinafter contained taken in conjunction with the accompanying drawings, discloses a preferred form of the invention by which the several objects and advantages above mentioned are attained, but it should be understood that although the various features of the invention may be and preferably are conjointly used, many of such features are independently useful, and that the invention accordingly is not confined to a structure embodying all of such features in combination. In the drawings—

Fig. 1 is a central longitudinal sectional view of a compressor cylinder and liner therefor, constructed in accordance with the invention.

Fig. 2 is an enlarged detail sectional view similar to Fig. 1 but showing detached the joint between the liner and cylinder body at the piston rod end of the cylinder.

Fig. 3 is a view similar to Fig. 2 but taken at the opposite end of the cylinder.

According to one feature of the invention the liner is supported at its opposite ends by the cylinder body in such a way as to provide a jacket space surrounding the liner wall and enclosed by the cylinder body, the joints between the ends of the liner and the cylinder body, and at which the liner is supported, being sealed to close off the jacket space above mentioned.

In accordance with another feature of the invention a simple and effective clamping device, consisting of parts acting between the liner and cylinder body, is employed to seat the liner in the body and properly seal the joints between the two.

The invention also makes it possible to form the valve openings for compressor cylinders directly in the cylinder body instead of in the cylinder heads, and includes certain other features hereinafter referred to in greater detail.

The illustrated embodiment of the invention includes a cylinder body casting 1 provided with suitable heads 2 and 3 at its opposite ends and a suitable piston 4 which reciprocates within the cylinder. Except as hereinafter noted, the detailed construction of the above mentioned parts is not essential to the present invention and they accordingly will not be described at length herein.

The liner member 5 is supported near its opposite ends upon annular seats 6 and 7 formed in the cylinder body 1, the illustrated form of liner being provided with annular flanges 8 and 9 which respectively fit the seats 6 and 7 above mentioned.

It will be noted that an annular jacket space 10 is formed between the cylinder body 1 and liner 5, such jacket space serving for cooling water when the cylinder is used for compressor purposes.

The liner 5 is detachably held in the proper position by a clamping member 11, preferably in the form of a ring which is received within an annular depression 12 adjacent the end of the liner which engages seat 7. The clamping member 11 is provided with a projecting lip 13 which bears against a part on the body member adjacent seat 7, and binding devices such as a suitable number of bolts 14 pass through openings 15 in clamping member 11 and are screwed into the liner; thus when the bolts 14 are tightened up the liner is drawn toward clamping ring 11, seating the liner tightly upon seats 6 and 7.

Preferably the lip 13 above mentioned is pressed against a gasket 16, of soft metal or other suitable packing material, when the bolts are tightened up as aforesaid, thereby effecting a fluid-tight seal for the joint at seat 7. The opposite seat 6 and the corresponding flange 8 on the liner also preferably are provided with opposed shoulders 17 and 18 respectively whereby the clamp draws shoulder 18 toward shoulder 17, and a similar gasket 19 may be interposed between these shoulders for the purpose of tightly sealing the joint at seat 6.

The above construction of the cylinder body member and the liner makes it possible to locate the valve openings 20 in the body member 1 instead of in the cylinder heads, the liner being detachably supported by the seats on the body member which are disposed between the valve openings 20, which latter thus do not interfere with the liner. Such a cylinder construction is less costly, requires no joints across the suction and discharge passages 21 and 22, nor does it require any internal bolting of the cylinder heads.

Furthermore the size of cylinder bore may be changed readily without sacrificing cooling efficiency since the water jacket acts directly against the cylinder liner and the substitution of different sized liners, does not involve changes in the thickness of the liner walls which would either reduce strength or increase the thickness of metal through which heat transfer must take place. Nor are any joints interposed between the cooling jacket and the walls of the liner, which joints in other types of construction materially increase the resistance to heat transfer.

The liner joints also are independent of any other joints whereby slight discrepancies in machining cannot cause leakages. The liner is also held tight at both ends by a clamping device which is located at and operated from one end of the cylinder.

While a specific embodiment of the invention has been described, it will be obvious that many changes may be made therein without departing from its principles as defined in the following claims.

I claim:

1. In combination, a cylinder body member and a liner enclosed thereby, said body member having seats slidably engaging the liner to support it, a clamping member overlying one end of the liner, and bolts engaging between said clamping member and the liner to draw the liner into proper position on said seats.

2. In combination, a cylinder body member and a liner enclosed thereby, said body member having a seat adjacent one end of the liner adapted slidably to support the latter, said liner and seat having opposed shoulders, a clamping member overlapping the opposite end of the liner, a packing adapted to be compressed by said clamping member and bolts engaging between said clamping member and liner to draw the shoulder on the liner toward the opposed shoulder on the seat and compress said packing.

3. In combination, a cylinder body member and a liner enclosed thereby, said body member having inwardly projecting flanges providing seats adjacent the ends of the liner to slidably support the liner and provide a jacket space between said flanges, said seats being provided with opposed shoulders, packings respectively associated with the joints between the liner and said seats, and a clamping member at one end of the liner for drawing the liner toward the clamping member and compressing said packings against said opposed shoulders.

4. In combination, a cylinder body member and a liner enclosed thereby, said body member having seats adjacent the ends of said liner slidably engaging the liner to support it, a clamping member adjacent one end of said liner and acting against a part on the body member adjacent the corresponding seat, and bolts acting between said clamping member and liner to draw the latter into proper position with regard to said seats.

5. In combination, a cylinder body member and a liner enclosed thereby, said body member having seats adjacent the ends of said liner slidably engaging the liner to support it, a clamping ring adjacent one end of said liner and acting against a part on the body member adjacent the corresponding seat, a gasket member also associated with said seat, and binding devices for exerting force between said liner and clamping ring to draw the liner into proper position with regard to said seats and bear upon said gasket member to seal the joint between the seat and liner at the corresponding end of the liner.

6. In combination, an integral cylinder body member having valve openings disposed respectively adjacent its opposite ends, head members detachably clamped to the opposite ends of said body member, and a liner enclosed by said body member, said liner being slidably supported by seats upon the body member which are adjacent the ends of the liner and located between the valve openings above mentioned and adjustable means for clamping said liner in position on said seats.

7. In combination, a cylinder body member and a liner enclosed thereby, said body member having seats adjacent the ends of said liner slidably engaging the liner to support it, opposed shoulders being provided on the liner and one of said seats, and means acting upon the remaining end of the liner for drawing its shoulder toward the shoulder on the seat, said last mentioned means comprising a clamping ring engaging said above mentioned remaining end of said liner, packing members being interposed respectively between said shoulders and between the clamping ring and its corresponding seat.

In testimony that I claim the foregoing, I have hereunto set my hand this 21st day of August, 1925.

HEWITT A. GEHRES.